June 11, 1929.  H. MESINGER  1,717,056
TANDEM ATTACHMENT FOR MOTOR VEHICLES
Filed Dec. 21, 1927  3 Sheets-Sheet 1
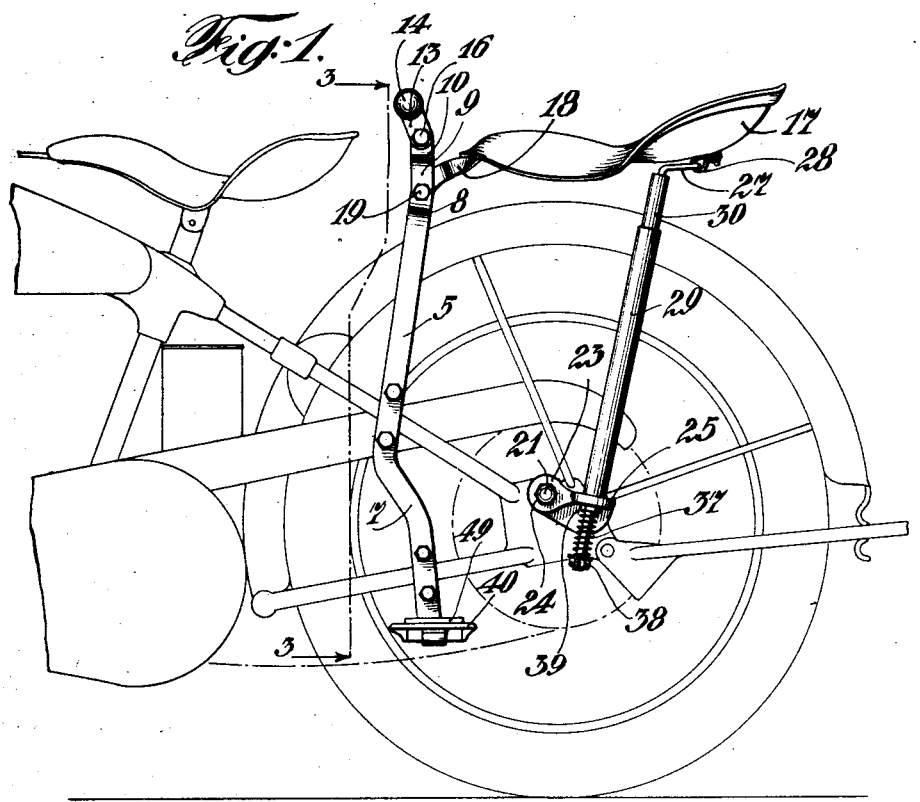
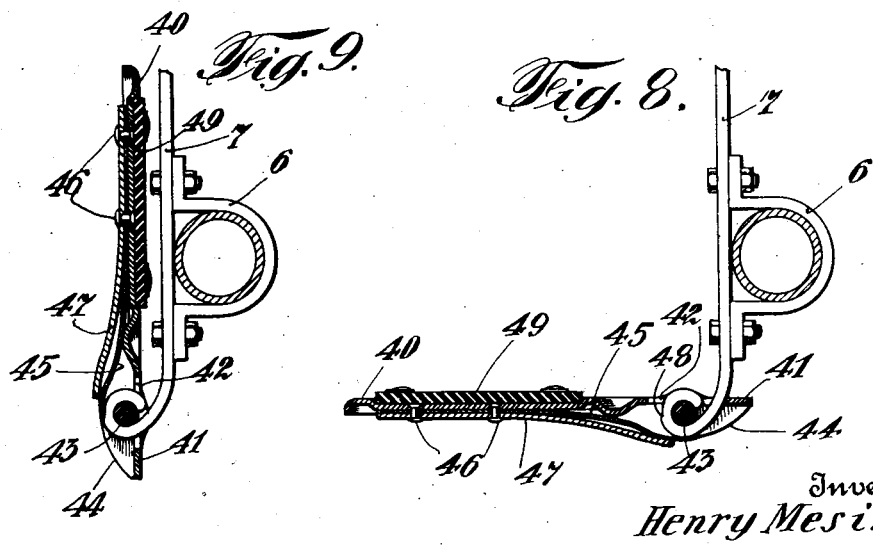
Inventor
Henry Mesinger
By his Attorney

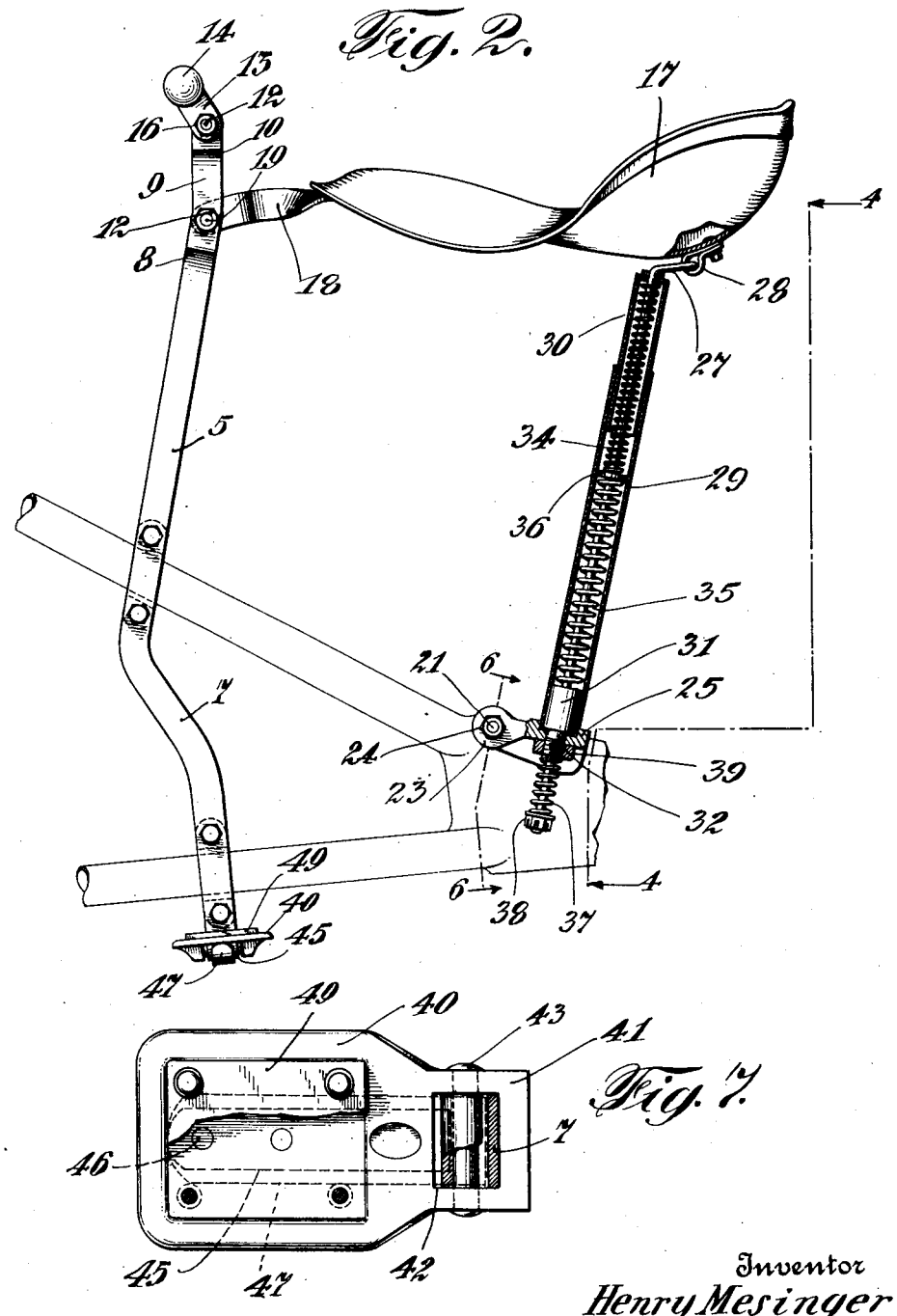

June 11, 1929.                H. MESINGER                    1,717,056
                    TANDEM ATTACHMENT FOR MOTOR VEHICLES
                         Filed Dec. 21, 1927      3 Sheets-Sheet 3
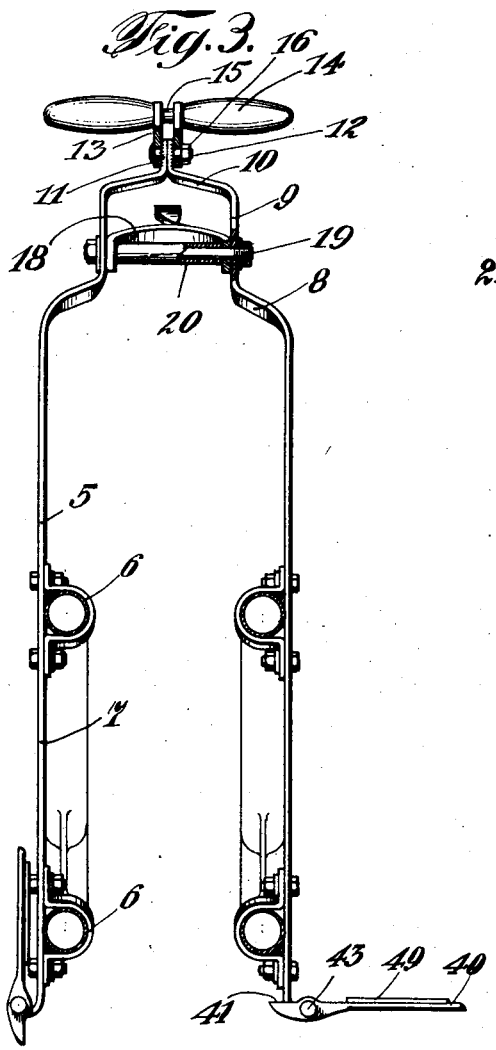
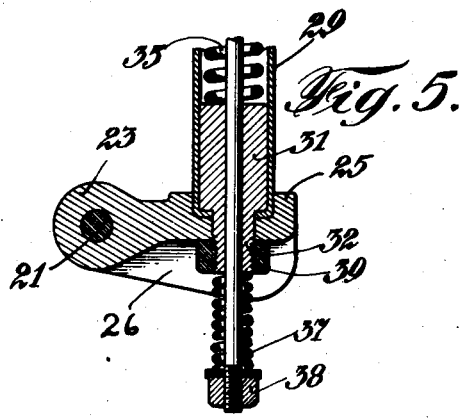
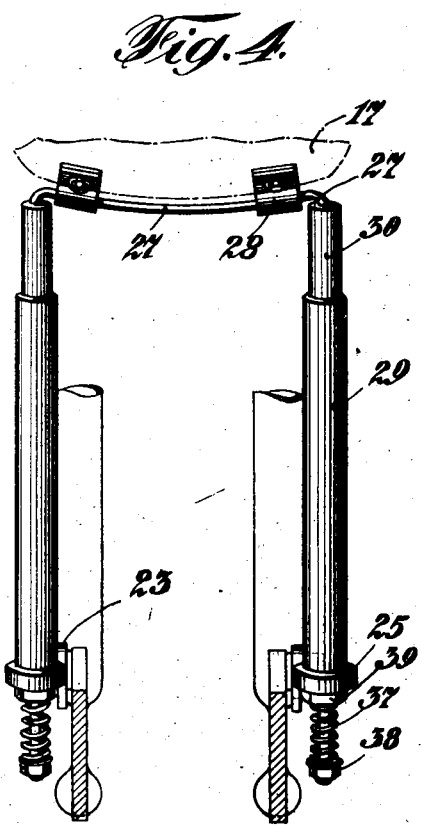
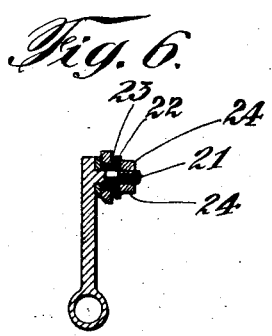
Inventor
Henry Mesinger
By his Attorney Patented June 11, 1929.

1,717,056

UNITED STATES PATENT OFFICE.

HENRY MESINGER, OF MOUNT VERNON, NEW YORK.

TANDEM ATTACHMENT FOR MOTOR VEHICLES.

Application filed December 21, 1927. Serial No. 241,519.

This invention relates to tandem attachments for motor vehicles, and has for its primary object and purpose to provide such an attachment affording an additional seat for an extra rider which is of exceedingly simple construction and low manufacturing cost and is capable of easy and quick application to the ordinary motor vehicle without necessitating any radical changes therein.

It is another object of my invention to provide a tandem attachment having a yieldably supported seat, and an improved arrangement of the seat supporting means relative to the seat and the motorcycle frame whereby it will be reliable and efficient in its functional operation, is protected against possible distortion or injury, and will not detract from the appearance of the motorcycle.

In carrying out the invention, in a practical embodiment thereof, I propose to provide the usual arched or U-shaped rod pivotally connected at its upper end to the rear end of the attachment seat which is pivotally supported at its forward end. Upon opposite sides of the rear vehicle wheel and pivotally mounted upon the rear fork connections of the motorcycle frame, I provide two plates and means for attaching to each of these plates the lower end of a metal tube through which one arm of the arch rod extends, said rod also being movable through a suitable guide means on said pivoted member and extending below the same. In each of said tube sections, an upper tube section is telescoped, said tube sections enclosing and concealing a cushioning spring surrounding the arm of the arch rod. Thus, in the initial downward movement of the seat under the weight of the rider, the pressure is transmitted through the springs to said pivoted members, the springs being subsequently placed under compression by the downward movement of the upper tube sections. Any shock or jar which might result from the return of the seat to its normal position is absorbed by suitable rebound springs on the lower ends of said arch rods.

Further objects of the invention reside in the provision of uprights rigidly secured to each side of the machine frame and means for attaching a pivotally adjustable handle to the upper ends of said uprights and also connecting the uprights with each other.

A further object of the invention is to provide a simple and convenient mounting for foot rests or pedal members upon the lower ends of said uprights whereby they may be easily folded upwardly against said uprights and retained in a vertical position.

With the above and other objects in view, the invention consists in the improved tandem attachment and in the form, construction and relative arrangement of its several parts as will be hereinafter more fully described, illustrated in the accompanying drawings, and subsequently incorporated in the subjoined claims.

In the drawings, wherein I have shown one simple and practical embodiment of the invention, and in which similar reference characters designate corresponding parts throughout the several views,—

Figure 1 is a side elevation of the rear portion of a motorcycle showing my improved tandem attachment applied thereto;

Fig. 2 is a similar view of the attachment on an enlarged scale, certain of the parts being shown in section;

Fig. 3 is a sectional view taken substantially on the line 3—3 of Fig. 1;

Fig. 4 is a rear elevation;

Fig. 5 is an enlarged detail vertical section taken on the line 5—5 of Fig. 4;

Fig. 6 is a detailed sectional view taken on the line 6—6 of Fig. 2;

Fig. 7 is a detail plan view of one of the pedal members, the supporting upright therefor being shown in section;

Fig. 8 is an enlarged vertical sectional view through one of the pedal members showing the same in its extended horizontal position, and Fig. 9 is a similar view showing the pedal member in its vertical folded position.

Referring in detail to the drawing, in the illustrated embodiment of my improved attachment, I have shown the vertical bars or uprights 5 arranged at each side of the machine frame and rigidly secured at spaced points to the upper and lower rear forks thereof by suitable clips indicated at 6. Preferably, a bend is formed in each of these side bars or uprights below its point of attachment to the upper fork of the machine frame as at 7 and above this fork member, said bars extend at a slight rearward inclination. Adjacent their upper ends, the uprights 5 are transversely bent inwardly towards each other as at 8 and then vertically extended to provide the parallel portions 9 in relatively close relation to each other. From the upper ends of these portions 9 of the uprights, they are again bent transversely towards each other and the extremities thereof engaged as at 10. The outer faces of these upper extremities of the uprights are provided with teeth or serrations indicated at 11 radiating from registering openings which are adapted to receive the connecting bolt 12. On opposite ends of this bolt, the arms 13 are loosely engaged at one of their ends, the other ends of said arms being provided with oppositely extending hand grips 14 which are rigidly connected with each other by the rod 15 which extends axially therethrough. On one end of bolt 12 a clamping nut 16 is threaded, and it will be obvious that by loosening this bolt, the arms 13 carrying the hand grips can be positioned in any desired angular relation with respect to the upper ends of the uprights 5 as may be most convenient to the rider. The arms 13 are of course, also provided on their opposing faces with teeth or serrations to engage the teeth 11 of the respective bars 5 whereby said arms are securely held against turning movement from their adjusted positions.

The seat 17 may be of the usual form provided on motorcycles, and at its forward end a longitudinally projecting forked bar 18 is suitably secured to the under side of said seat. The arms of the fork project between the spaced parts 9 of the uprights 5 and are pivotally engaged upon a connecting rod 19 between said uprights, a spacer sleeve 20 being engaged upon said rod between the ends of the fork 18.

Upon the connecting plates between the rear ends of the upper and lower forked members of the machine frame, the threaded studs 21 may be welded or otherwise suitably fixed. Upon each of these studs a bushing 22 is engaged and extends loosely through an opening in one end of the member 23 whereby said member may have free pivotal movement. The bushing is securely held upon said stud by means of the nut 24 threaded on the end thereof. As herein shown, the member 23 is in the form of a metal plate extending rearwardly from the pivot stud 21 and provided with an opening therethrough and an annular recess 25 surrounding said opening in the upper face of the plate. At its inner edge next adjacent to the machine frame, said plate is formed with a downwardly projecting flange 26 which serves to guide the pivotal movement of said plate and prevent bending strain on the pivot stud 21.

The intermediate portion of an arch rod 27 is connected with the under side of the seat 17 by the hinge clips 28. The arms of this rod extend downwardly through telescoping sleeve or tube sections 29 and 30 respectively. The longer tube section 29 which is open at its upper end to slidably receive the tube section 30 has a closed lower end engaged in the recess or seat 25 of the member 23. This lower end wall of the tube section has an opening therethrough receiving a threaded extension 32 on a guide bushing 31 within said tube section. The arms of the arch rod extend downwardly through the telescoping tube sections and are movable through axial bores of the members 31 and extend below the pivoted members 23. Within the telescoping tube sections and surrounding the arch rod, suitable cushioning springs are arranged. If desired, I may use a single spring extending between the upper closed end of the tube section 30 and the bushing 31. As shown however, a relatively weak spring 34 may be arranged upon the upper portion of the arch rod while a stronger spring 35 is arranged on the lower portion thereof. A separating disc 36 is loosely engaged upon an arch rod between these springs. Upon the lower ends of the arch rod projecting below the members 23, the rebound springs 37 are arranged, suitable tension adjusting nuts for said springs indicated at 38 being threaded upon the ends of the rod. The extension 32 of bushing 31 is threaded to receive a clamping nut 39 which engages the under side of the member 23.

It will be evident from the above description that when the weight of a rider is imposed on the seat 17, it will be moved in a downward arc from the pivot rod 19. The upper tube sections 30 will therefore, slidably move downwardly in the lower tube sections 29, and the cushioning springs within said tube sections will be compressed and thus cushion the movement of the seat. In this compression of the springs, the members 23 will pivot on the studs 21. Therefore, the members 23 will also have a slight arcuate movement with the seat 17, so as to prevent bending or distortion of the downwardly extending arms of the arch rod as they move through the guide bushings 31.

In Figs. 7, 8 and 9 of the drawings, I have illustrated an improved mounting for the foot pedals upon which the occupant of the seat 17 rests his feet. As shown, each of these pedals consists of a metal plate 40 having a reduced end portion 41 with an opening 42 therein. The lower end of the upright 7 extends downwardly through this opening and is loosely engaged around a rod or rivet 43 fixed at its opposite ends in side flanges 44 on the end portion 41 of the pedal. It will be noted that the upright extends through opening 42 at the rear or inner side of the rod 43 and is bent outwardly and upwardly around the same. Upon the under side of the pedal plate, a longitudinally extending leaf spring 45 is secured by the rivets 46 which also secure a relatively heavy metal strip 47 in superposed relation upon said spring plate. One end of said spring plate however, projects beyond the plate 47 and upon the lower outwardly turned end of the upright 5. This lower end of the upright is provided with a transverse shoulder shown at 48. Upon the upper side of the pedal plate, a tread pad of rubber or other suitable material indicated at 49 is secured. When the pedal is in its horizontal position as seen in Fig. 8 of the drawings to support the rider's foot, one side edge of the opening 42 in said plate is engaged against the rear side of the upright 5 which thus provides a rigid stop, limiting pivotal movement of the pedal plate to such horizontal position. In order that said pedal may not obstruct the free movement of the rider in mounting to his position on the seat 17, it is adapted to be folded upwardly to a vertical position against the upright 5 as seen in Fig. 9 of the drawings, and upon movement of the pedal plate to this position, the free end of the leaf spring 45 projecting beyond the plate 47, snaps upon the shoulder 48, and thus retains said pedal in its vertical position against accidental downward and outward movement. However, when sufficient outward pressure is applied, the spring will yield and ride over said shoulder so that the pedal may be disposed in its horizontal position.

From the foregoing description considered in connection with the accompanying drawings, it is believed that my improved tandem attachment and its several advantages in practical use will be fully and clearly understood. It will be seen that I have devised a very novel mounting and arrangement for the cushioning springs of the seat, insuring their efficient and reliable action, while at the same time these springs are entirely enclosed and concealed within the telescopically engaged tube sections. Therefore, the cushioning springs are not only protected against injury, but the appearance of the machine is also improved. It will also be noted that the several parts of the attachment are of very simple form so that they can be readily produced at low manufacturing cost and the attachment may be readily applied by unskilled labor to its operative position upon the ordinary motorcycle now on the market without necessitating any radical alterations in the construction thereof. Also by the provision of the angularly adjustable hand grip at the upper end of the uprights 5, the same may be readily positioned to suit the convenience of the rider. The construction and arrangement of these uprights 5 also provides an exceedingly rigid and durable construction of the seat supporting frame having only two points of attachment to the forked members of the motorcycle frame.

I have herein shown a construction and arrangement of the several cooperating elements constituting my present invention which has been found entirely satisfactory in practical use. Nevertheless, it is apparent that many of the advantages herein enumerated might also be obtained by various other alternative constructions, and I accordingly reserve the privilege of making all such legitimate changes as may be fairly embodied within the spirit and scope of the invention as claimed.

I claim:

1. A tandem attachment for motorcycles comprising a frame consisting of upright bars arranged at opposite sides of the rear forks of the motorcycle frame, and means for rigidly clamping said upright bars to the frame forks, a tandem seat pivotally supported at its forward end between the upper ends of said bars, and cushioning means for said seat including a rod pivotally connected to the rear end of the seat, a member pivoted at one end upon the motorcycle frame extending rearwardly from said frame and constituting a guide for said rod, and a spring surrounding said rod extending between the upper end of said rod and said pivoted member and means enclosing said spring and connected at its lower end with said pivoted member.

2. A tandem attachment for motorcycles comprising a frame consisting of upright bars arranged at opposite sides of the rear forks of the motor cycle frame, and means for rigidly clamping said upright bars to the frame forks, a tandem seat pivotally supported at its forward end between the upper ends of said bars, and cushioning means for said seat including a rod pivotally connected to the rear end of the seat, a member pivoted at one end upon the motorcycle frame extending rearwardly from said frame and constituting a guide for said rod, telescopically engaged tubes surrounding said rod, means for rigidly connecting the lower end of the lower tube with said pivoted member, and spring means surrounding said rod within said tubes normally holding the tubes in distended relation and yieldingly transmitting the downward movement of the seat to said pivoted member.

3. A tandem attachment for motorcycles comprising a frame consisting of upright bars arranged at opposite sides of the rear forks of the motorcycle frame, and means for rigidly clamping said upright bars to the frame forks, a tandem seat pivotally supported at its forward end between the upper ends of said bars, and cushioning means for said seat including a rod pivotally connected to the rear end of the seat, a member pivoted at one end upon the motorcycle frame extending rearwardly from said frame and constituting a guide for said rod, telescopically engaged tubes surrounding said rod, means for rigidly connecting the lower end of the lower tube with said pivoted member, spring means surrounding said rod within said tubes normally holding the tubes in distended relation and yieldingly transmitting the downward movement of the seat to said pivoted member, and a rebound spring surrounding the lower end of said rod and coacting with said pivoted member to yieldingly check the rebound of the seat to its normal position.

4. A tandem attachment for motorcycles comprising upright frame bars and means for rigidly clamping each of said frame bars to the rear forks of a motorcycle frame at one side thereof, a tandem seat pivotally supported at its forward end between the upper ends of said bars, an arch rod having an intermediate portion hingedly connected to the rear end of the seat, members adapted to be pivotally mounted at one of their ends upon opposite sides of the motorcycle frame and having guide means for the respective legs of said arch rod, telescopically engaged tubes surrounding each leg of the arch rod, one of the tubes being fixed at one of its ends to one of said members, and spring means housed within said telescoped tubes, and distending the same to yieldingly support the tandem seat in its normal position.

5. A tandem attachment for motorcycles comprising upright frame bars and means for rigidly clamping each of said frame bars to the rear forks of a motorcycle frame at one side thereof, a tandem seat pivotally supported at its forward end between the upper ends of said bars, an arch rod having an intermediate portion hingedly connected to the rear end of the seat, members adapted to be pivotally mounted at one of their ends upon opposite sides of the motorcycle frame and having guide means for the respective legs of said arch rod, telescopically engaged tubes surrounding each leg of the arch rod, one of the tubes being fixed at one of its ends to one of said members, spring means housed within said telescoped tubes, and distending the same to yieldingly support the tandem seat in its normal position, and rebound springs on the lower end of each leg of the arch rod adapted to yieldingly check the return movement of the seat to its normal position.

6. In combination with a motorcycle frame, a tandem attachment therefor comprising upright bars and means for rigidly attaching said bars to the respective rear forks of the motorcycle frame, a tandem seat pivotally supported at its forward end between said bars, rearwardly extending members pivotally mounted at their forward ends upon opposite sides of the motorcycle frame, an arch rod hingedly connected at its intermediate portion to the rear end of the seat, means carried by each of said pivoted members slidably guiding the respective legs of the arch rod in the pivotal movement of the seat, telescoping tubes surrounding each leg of the arch rod between the seat and said pivoted members, and spring cushioning means for the seat housed within said telescoping tubes.

In testimony that I claim the foregoing as my invention, I have signed my name hereto.

HENRY MESINGER.